3,677,933
MOLYBDENUM-ANTIMONY CATALYSTS FOR HYDROCARBON TREATING

Marvin M. Johnson and Donald C. Tabler, Bartlesville, Okla., assignors to Phillips Petroleum Company
No Drawing. Filed Sept. 8, 1970, Ser. No. 70,503
Int. Cl. C10g 13/02, 13/04
U.S. Cl. 208—109          9 Claims

ABSTRACT OF THE DISCLOSURE

Hydrocarbons are hydrocracked and desulfurized by contacting with supported molybdenum-antimony catalysts.

---

This invention relates to the use of molybdenum-antimony catalysts for hydrocarbon treating.

In one of its more specific aspects, this invention relates to a process of treating paraffinic hydrocarbons with a supported molybdenum-antimony catalyst for the purpose of hydrocracking and/or desulfurizing.

According to this invention there is provided a method for hydrotreating hydrocarbons to hydrocrack and/or desulfurize the hydrocarbon by contacting the hydrocarbon with hydrogen and with a supported catalyst comprising molybdenum and antimony.

The method of this invention is applicable to heavy hydrocarbon-containing feedstocks such as crude oil, heavy residual fractions and heavy lubricating oil fractions derived therefrom. The process is particularly applicable when these feedstocks are paraffinic or contain a substantial paraffinic content, and is applicable to paraffins having as few as six carbon atoms per molecule. If employed for desulfurization, the method can be carried out using heavy aromatics as feedstocks.

The catalysts which are employed by the method of this invention are comprised of supported molybdenum and antimony. The molybdenum is present in an amount within the range from about 3 to about 15 weight percent of the total catalyst composition. Preferably, it will be present from about 7 to about 10 weight percent.

The antimony is present in an amount such that the weight ratio of molybdenum to antimony will be within the range of from about 3 to 1 to about 1 to 1 and preferably from about 2 to 1 to about 3 to 2.

The molybdenum and antimony are generally supported on a nonacidic refractory metal oxide such as alpha-alumina, gamma-alumina, silica, calcium aluminate, magnesium oxide and their mixtures. Such supports are typical catalytic grade materials and will have a surface area of at least 1 m.²/g., gamma-alumina and alpha-alumina are preferred supports.

The catalysts are prepared by conventional methods of aqueous impregnation of dry mixing followed by calcination. For example, aqueous solutions of suitable antimony and molybdenum salts can be slurried with the support which is thereafter dried and calcined. A paste can be formed by mixing powdered catalytic alumina with an aqueous solution comprising antimony pentachloride and ammonium molybdate. The paste is neutralized with ammonium hydroxide, dried, granulated and calcined.

Similarly, a preformed catalyst pellet can be impregnated with the applicable salt solution; for example, an alumina pellet can be impregnated with an aqueous solution of antimony trioxide, ammonium molybdate, tartaric acid and nitric acid. The impregnated pellet is then calcined.

In preparation by dry mixing, antimony trioxide and molybdenum trioxide can be ball-milled with a dry alumina gel powder and the resulting mixture pelletized and calcined.

Calcination procedures are those conventionally employed in catalyst preparation and involve maintaining the catalyst at temperatures of 900–1400° F. for about 0.1 to about 24 hours. Thereafter, reduction in hydrogen is carried out at 500 to 1400° F. for about 0.1 to about 24 hours.

After the catalyst has been spent in the process, it can be regenerated by calcination in air and reduction in hydrogen under the aforestated conditions.

The method of this invention is carried out by contacting the feedstock, in either the liquid or vapor phase, with hydrogen and with the catalyst at a pressure within the range of from about 100 to about 1500 p.s.i.g., and preferably about 400 to 1000 p.s.i.g. The reaction temperature is dependent upon the nature of the feedstock, feedstocks containing substantial quantities of aromatics generally being processed above about 700° F. to avoid excessive hydrogenation. Generally, however, the processing temperature will be within the range of about 650° F. to about 1000° F.

The hydrocarbon liquid hourly space velocity feed rate generally will be within the range of about 0.5 to about 5, preferably 1 to about 3, while the hydrogen feed rate will be within the range of about 1000 to about 4000 s.c.f. per barrel of hydrocarbon feed.

The process can be carried out either continuously or batchwise, a packed bed being preferably employed with conventional fractionation equipment being supplied to separate and recover the product.

The following examples illustrate typical methods of preparing the catalyst and of carrying out the process. While they exemplified the best mode of doing so, they are not to be considered as limiting the invention to the specific embodiments employed.

EXAMPLE I

A catalyst comprising molybdenum and antimony on gamma-alumina was prepared. A mixture of 30.0 g. of molybdenum trioxide, 13.9 g. of antimony oxide and 168.4 g. of catalytic gamma-alumina gel was ball-milled for about 40 hours. Thereafter, the powder was dried, screened and blended with 10.2 g. of polyethylene powder which was intended to serve as a pelletizing lubricant. The powder was formed into ⅛" x ⅛" cylindrical pellets which were calcined at 950° F. for about 2½ hours. Thereafter, the pellets were reduced in a stream of hydrogen at about 800° F. The catalyst contained 9.9 weight percent molybdenum and 4.7 weight percent antimony.

This catalyst was employed in the process of Example II.

EXAMPLE II

A portion of the catalyst prepared in Example I was employed in a packed bed for the processing of a waxy Umbarka crude oil in two runs. For comparison purposes, a similar run was carried out using a commercially available cobalt - molybdate - on - alumina hydrotreating catalyst. This catalyst was Harshaw's CoMo 0301T catalyst, this catalyst being in the form of ⅛" pellets and containing 8.5 weight percent $MoO_3$ and 2.5 weight percent CoO. It is available from Harshaw Chemical Company, a division of Kewanee Oil Company, Cleveland, Ohio. All catalysts were activated by reduction in hydrogen before use.

Feedstock properties, operating conditions and test results were as follows:

| | Feed stock | Run number | | |
|---|---|---|---|---|
| | | 1 | 2 | 3 |
| Catalyst | | (¹) | (¹) | Harshaw |
| Operating conditions: | | | | |
| Temperature, °F | | 859 | 885 | 760 |
| Pressure, p.s.i.g | | 400 | 600 | 400 |
| Feed rate, LHSV | | 1 | 1 | 1 |
| Hydrogen rate, s.c.f./bbl | | 4,300 | 3,080 | 1,670 |
| Recovery, liquid product as weight percent of feed | | 84.0 | 86.0 | 82.5 |
| | | Liquid product | | |
| Analysis: | | | | |
| Pour point, °F | <70 | <32 | <32 | 54 |
| Cloud point, °F | 70 | <32 | <32 | 48 |
| Gravity, °API | 44.7 | 44.6 | 46.3 | 51.4 |
| Total sulfur, p.p.m | 300 | 5 | 4 | (²) |

¹ Invention.
² Undetermined.

The above data indicate that Runs 1 and 2, conducted according to this invention, produced a product having a substantially reduced pour point as compared to that of the crude oil and produced a liquid differing little in gravity from that of the crude oil. Comparatively, Run 3 produced a liquid product having a higher pour point and a higher API gravity. This indicates that the process of the invention appears to be more selective in cracking the wax components of the crude oil than is the commercial catalyst.

Also, the sulfur analysis shows that the invention process is effective for desulfurization.

EXAMPLE III

Catalysts similar to those prepared in Example I, some supported on gamma-alumina having a surface area of 100–200 m.²/g. and some supported on predominantly alpha-alumina which had been a high surface alumina heat-treated to reduce its surface to about 6 m.²/g., were employed in the treating of a waxy lube oil fraction. This fraction has a melting point of about 140° F. and an API gravity of 29.1°.

In all runs, the fraction was charged at a LHSV of 1 with the hydrogen rate being 1600 s.c.f./bbl.

Other operating conditions and results of the runs were as shown below. Runs 4, 5, 6 and 7 were carried out using the high surface area gamma-alumina and Runs 8, 9 and 10 employed the low surface area alpha-alumina.

| | Run Number | | | | | |
|---|---|---|---|---|---|---|
| | 4 | 5 | 6 | 7 | 8 | 9 | 10 |
| Operating conditions: | | | | | | | |
| Temperature, °F | 889 | 829 | 835 | 801 | 800 | 817 | 838 |
| Pressure, p.s.i.g | 400 | 400 | 800 | 200 | 100 | 100 | 100 |
| Recovery, liquid as weight percent of feed | 72.5 | 85.0 | 84.5 | 84.6 | | | 94.4 |
| Liquid product analysis: | | | | | | | |
| Gravity, °API | 45.7 | 41.0 | 40.6 | 38.0 | | | 37.8 |
| Cloudpoint, °F | 48 | 85 | 93 | 90 | 95 | 93 | 83 |

The above data illustrate that the process of the invention substantially reduces the wax content, as shown by the relatively low cloud points, over a wide range of operating conditions.

In the following example a highly aromatic, high sulfur oil was treated according to the method of the invention.

EXAMPLE IV

A catalyst was prepared by forming a paste of 70 g. of finely divided, flame-hydrolyzed alumina (Alon-C) and a solution prepared from 14.8 g. of $(NH_4)_6Mo_7O_{24} \cdot H_2O$ and 8 ml. of $SbCl_5$ in 250 ml. water. The paste was adjusted to a pH of about 8 by the addition of 33 ml. of a 28 weight percent ammonia solution. The paste was dried, heated at 600° F. for three hours and then at 1,000° F. for one hour. The resulting solid was ground and that portion screened to 10–35 mesh was reduced in a stream of hydrogen at about 800° F. for about one hour. This finished catalyst contained 8.1 weight percent molybdenum and 4.1 weight percent antimony.

This catalyst was employed in the method of the invention to desulfurize a highly aromatic extract oil, the composition of which, together with the operating conditions and results, are shown below.

OPERATING CONDITIONS

| | Run |
|---|---|
| Feedstock, LHSV | 1.4 |
| Hydrogen charge rate, s.c.f./bbl. | 4300 |
| Temperature, °F. | 800 |
| Pressure, p.s.i.g. | 600 |

| | Feedstock | Liquid product |
|---|---|---|
| Analysis: | | |
| Gravity, °API | 9.2 | 11.6 |
| Carbon, weight percent | 88.8 | 89.4 |
| Hydrogen, weight percent | 8.8 | 8.9 |
| Total sulfur, weight percent | 2.09 | 0.97 |

These data illustrate the effectiveness of the method of the present invention in desulfurization.

The method of the invention was employed to cleave paraffins by hydrogenolysis in the following evample.

EXAMPLE V

A portion of that catalyst prepared in Example IV was used in the hydrogenolysis of n-hexadecane. Operating conditions and results were as follows:

OPERATING CONDITIONS

Feed—Hexadecane

| | |
|---|---|
| Feed rate, LHSV | .1 |
| Hydrogen rate, moles/mole feed | 8 |
| Temperature, °F. | 821 |
| Pressure, p.s.i.g. | 400 |

RESULTS

| | |
|---|---|
| Conversion percent | 70.6 |

Yields, moles $C_{16}$ converted to product per 100 moles converted:

| | |
|---|---|
| $C_4$ and lighter | 13.55 |
| $C_5$ | 7.47 |
| $C_6$ | 8.74 |
| $C_7$ | 12.16 |
| $C_8$ | 8.10 |
| $C_9$ | 8.04 |
| $C_{10}$ | 8.06 |
| $C_{11}–C_{15}$ | 33.95 |
| Total | 100.07 |

The above data illustrate the effectiveness of the method of this invention in hydrocracking paraffins.

Relatedly, in a similar test in which thiophene had been incorporated in n-hexane to the extent of about 15 weight percent, the hydrocracked effluent from the reaction zone contained only a trace of thiophene.

It will be evident from the foregoing that various modifications can be made to the method of this invention. Such, however, are considered as being within the scope of the invention.

What is claimed is:

1. A method of hydrotreating hydrocarbons to hydrocrack and desulfurize said hydrocarbons which comprise contacting said hydrocarbon with a supported catalyst consisting essentially of molybdenum and antimony and with hydrogen and recoverig the hydrotreated product.

2. The method of claim 1 in which a substantially parafinic hydrocarbon containing at least 6 carbon atoms is contacted with said catalyst comprising molybdenum and antimony, said molybdenum being present in the amount in the range of from about 3 to about 15 weight percent of said catalyst and said antimony being present in an amount in the range of from about 1 to about ⅓ part per part by weight of said molybdenum at a temperature in the range of from about 650° F. to about 1000° F. at a pressure in the range of about 100 to about 1500 p.s.i.g., the feed rate of said hydrocarbon being in the range of from about 0.5 to about 5 LHSV, said hydrogen feed rate being in the range of from about 1000 to about 4000 s.c.f./bbl. of said hydrocarbon.

3. The method of claim 2 in which said supported catalyst is supported on a material selected from the group consisting of alpha-alumina, gamma-alumina, silica, calcium aluminate, magnesium oxide and mixtures thereof, said material having a surface area of not less than 1 m.²/g.

4. The method of claim 1 in which a substantially aromatic hydrocarbon comprising sulfur is contacted with said catalyst comprising molybdenum and antimony, said molybdenum being present in an amount in the range of from about 3 to about 15 weight percent of said catalyst and said antimony being present in an amount of from about ⅓ to 1 to about 1 to 1 parts per part by weight of said molybdenum at a temperature in the range of from about 700° F. to about 1000° F. at a pressure in the range of about 100 to about 1500 p.s.i.g., the feed rate of said hydrocarbon being in the range of from about 0.5 to about 5 LHSV, said hydrogen feed rate being in the range of from about 1000 to about 4000 s.c.f./bbl. of said hydrocarbon.

5. The method of claim 1 in which said molybdenum and said antimony are contained in said catalyst in a weight ratio of molybdenum to antimony within the range of about 3 to 1 to about 1 to 1.

6. The method of claim 1 in which said supported catalyst is produced by combining molybdenum oxide and antimony oxide with a support, calcining the combination and reducing the calcined combination.

7. The method of claim 6 in which said supported catalyst is produced by impregnating a support with aqueous solutions of antimony and molybdenum salts, calcining the impregnated support and reducing the calcined support.

8. The method of claim 1 in which said catalyst is regenerated after said hydrotreating.

9. The method of claim 8 in which said catalyst is regenerated by calcination in air and reduction in hydrogen.

References Cited

UNITED STATES PATENTS

| | | | |
|---|---|---|---|
| 3,099,617 | 7/1963 | Tulleners | 208—109 |
| 3,390,074 | 6/1968 | Mulaskey | 252—456 |
| 2,944,005 | 7/1960 | Scott | 208—109 |
| 3,117,074 | 1/1964 | Honerkamp et al. | 208—109 X |
| 3,536,632 | 10/1970 | Kroll | 208—109 X |

TOBIAS E. LEVOW, Primary Examiner

P. F. SHAVER, Assistant Examiner

U.S. Cl. X.R.

208—110; 252—456